United States Patent Office 3,235,368
Patented Feb. 15, 1966

3,235,368
STABILIZATION OF HERBICIDE
John M. Surgant, Richmond Heights, Mo., assignor to Monsanto Company, a corporation of Delaware
No Drawing. Filed Apr. 16, 1965, Ser. No. 448,830
18 Claims. (Cl. 71—2.7)

The present application is a continuation-in-part of copending application Serial No. 189,977, filed April 25, 1962, now abandoned. This invention relates to solid granular herbicidal compositions of improved properties. The invention also provides a method of stabilizing certain herbicides from chemical decomposition, known to occur in the presence of clays.

Herbicides which can be benefited by the practice of this invention are those of the following general structure

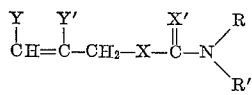

wherein X and X' are elements selected from the class consisting of oxygen and sulfur, provided that at least one of the X and X' groups is sulfur; wherein Y and Y' are selected from the group consisting of hydrogen and chlorine, provided that at least one of the Y and Y' radicals is chlorine; and wherein R and R' radicals are aliphatic hydrocarbon radicals having up to four carbon atoms.

This invention is useful in stabilizing the following compounds:

(A) Chloroallyl dialiphatic dithiocarbamates, including 2-chloroallyl diethyldithiocarbamate
3-chloroallyl diethyldithiocarbamate
2-chloroallyl dimethyldithiocarbamate
3-chloroallyl dimethyldithiocarbamate
2-chloroallyl diisopropyldithiocarbamate
3-chloroallyl diisopropyldithiocarbamate
2-chloroallyl diallyldithiocarbamate
2-chloroallyl allylethyldithiocarbamate
2,3-dichloroallyl dimethyldithiocarbamate
2,3-dichloroallyl dithiocarbamate
2,3-dichloroallyl diethyldithiocarbamate
2,3-dichloroallyl dibutyldithiocarbamate
2-chloroallyl methylethyldithiocarbamate
3-chloroallyl ethylisopropyldithiocarbamate and the like.

(B) Chloroallyl dialiphaticthionocarbamates, including 2-chloroallyl diethylthionocarbamate
2-chloroallyl dipropargylthionocarbamate
3-chloroallyl diallylthionocarbamate
3-chloroallyl methylethylthionocarbamate
2,3-dichloroallyl diethylthionocarbamate
2,3-dichloroallyl ethylallylthionocarbamate
2-chloroallyl methlethylthionocarbamate
2-chloroallyl ethylallylthionocarbamate
2-chloroallyl di-n-propylthionocarbamate and the like.

(C) Chloroallyl dialiphaticthiolcarbamates, such as, for example, 2-chloroallyl diethylthiolcarbamate
3-chloroallyl dimethylthiolcarbamate
2-chloroallyl methylethylthiolcarbamate
2-chloroallyl diallylthiolcarbamate
2,3-dichloroallyl diethylthiolcarbamate
2-chloroallyl allyl-n-butylthiolcarbamate
2-chloroallyl diisopropylthiolcarbamate
3-chloroallyl methylethylthiolcarbamate
2-chloroallyl propargylethylthiolcarbamate and
2,3-dichloroallyl allylisopropylthiolcarbamate.

The granular herbicides are prepared from performed granules of the desired clay with substantially the desired particle size. The granular clay is passed through an inclined rotating cylinder at a predetermined rate and sprayed with the amount of toxicant to provide a herbicide with the desired concentration of the carbamate. Batch procedures may also be used wherein measured proportions of the components are mixed by any conventional mixing device. Since the particle sizes are important and fines should be minimized, the mixing method should not involve any severe physical breakdown of the particles.

The herbicidal compositions will usually contain from about 5 to about 30 percent by weight of the herbicidally active component and the balance, the clay and other components as are hereinafter described. Preferred herbicides will have from about 10 to about 25 percent by weight of the toxicant carbamates.

It has been found that when the described carbamates are incorporated in the granular clays, a decomposition of the carbamates takes place. It is not known whether this is a surface phenomenon or whether it is a thermal decomposition; however, it can cause serious reduction in the active component, for example 25 to 30 percent, within normal storage periods. This decomposition is believed to be in accordance with the equation

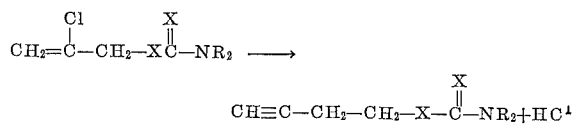

It is conventional to formulate these herbicides by incorporating them in clays, and preferably in granular clays. These may be of 10 to 100 mesh in size but preferably 15 to 80 mesh (U.S. Standard Series). For best performance in the distribution equipment it is desirable to have at least 80 percent of the particles between 20 and 40 mesh. These granules are preformed from clays such as attapulgite, illite, the bentonites, montmorillonite and other absorptive or adsorptive clays capable of being granulated. Because of the stability and hardness of the granules, attapulgite and illite are preferred.

It has been found that in the presence of certain alcohols this decomposition is minimized. The alcohols which effect this beneficial result are those which have the structure

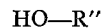

wherein R" is a radical selected from the group consisting of (1) aliphatic hydrocarbon radicals having from 5 to 12 carbon atoms and at least one oxa atom, and (2) cycloaliphatic radicals having 5 to 7 carbon atoms. Alcohols of this type include cyclohexanol, monobutyl ether of ehylene glycol, 6-oxadecanol, 2-ethylhexanol, decenyl alcohol, isodecyl alcohol, capryl alcohol, octynyl alcohol, dodecyl alcohol, cyclopentanol, monohexylether of gylcol, monoallyl ether of diethylene glycol and cyclohexenyl alcohol.

The proportions of the stabilizing agent should be from about 10 to about 50 percent of toxicant. For the optimum concentration of 20 percent by weight the final composition will have from two to ten percent by weight with the balance being the clay.

Further details of the compositions and their stability are set forth in the following specific examples.

*Example 1*

Twenty percent concentrations of 2-chloroallyl diethyldithiocarbamate in several varieties of granular clays were prepared and aged for eight weeks at 60° C. The loss in active component was measured as follows:

| Clay: | Loss, percent |
|---|---|
| Attapulgite (Attclay) | 25 |
| Montmorillonite (Pikes Peak) | 25 |
| Illite (Creek-O-Nite) | 27 |
| Illite (Portaclay) | 29 |

*Example 2*

Three samples of attapulgite in granular form containing 20% of 2-chloroallyl diethyldithiocarbamate were treated with 5%, 3% and 1% (of the composition) of monobutyl ether of ethylene glycol, respectively. These were aged as described in the preceding example and were found to have lost active component in the amounts of 3%, 4% and 11%, respectively.

*Example 3*

The procedure described in Example 1 was repeated except that isodecyl alcohol was used. In eight weeks samples with 5%, 4%, 3%, 2% and 1% had lost only 4%, 4%, 9% 15% and 17%, respectively.

*Example 4*

The stabilizing effect of cyclohexanol was measured by the procedure above described. Samples with 5%, 3% and 1% were aged at 60° C. for eight weeks. Losses of 4%, 7% and 15%, respectively, were measured.

The preferred method of using the above compositions is in the pre-emergent control of undesirable vegetation. The herbicides are applied to the surface of the soil at the rate of about 1/10 to about 10 pounds per acre of the herbicidal active component. If desired, the herbicidal compositions can be mixed with the surface soil by a harrow or other cultivating apparatus. The compositions can be applied to unplanted soil or to soil in which crop seeds have been planted.

The invention is set forth above with respect to specific examples. It is not intended that the details thereof shall be limitations on the scope of the invention except as set forth in the following claims.

What is claimed is:

1. A solid herbicide comprising granular clay, from about 5 to about 30 percent by weight of a carbamate of the structure

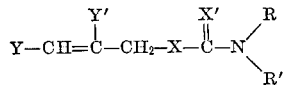

wherein X and X' are atoms selected from the group consisting of oxygen and sulfur, provided at least one of the X and X' atoms is sulfur; wherein Y and Y' are atoms of the group consisting of hydrogen and chlorine, provided at least one of the Y and Y' is chlorine; and wherein R and R' are aliphatic hydrocarbon having up to four carbon atoms, and containing from about 10 to about 50 percent by weight (based on the carbamate) of an alcohol

wherein R" is selected from the group consisting of aliphatic hydrocarbon having from 5 to 12 carbon atoms, the said aliphatic hydrocarbon having at least one oxa atom and cycloalkyl having 5 to 7 carbon atoms.

2. A herbicidal composition defined by claim 1 wherein the granules are from 10 to 100 mesh particle size distribution.

3. A solid herbicide comprising granular clay, about 10 to about 25 percent by weight of 2-chloroallyl diethyldithiocarbamate, and from about 10 to about 50 percent by weight (based on the carbamate) of monobutyl ether of ethylene glycol.

4. A solid herbicide comprising granular clay of 10 to 100 mesh particle size distribution, from about 10 to about 25 percent by weight of 2-chloroallyl diethyldithiocarbamate, and from about 10 to about 50 percent by weight (based on the carbamate) of monobutyl ether of ethylene glycol.

5. A solid herbicide comprising granular clay, from about 10 to about 25 percent by weight of 2-chloroallyl diethyldithiocarbamate, and from about 10 to about 50 percent by weight (based on the carbamate) of cyclohexanol.

6. A solid herbicide comprising granular clay of 10 to 100 mesh particle size distribution, from about 10 to about 25 percent by weight of 2-chloroallyl diethyldithiocarbamate, and from about 10 to about 50 percent by weight (based on the carbamate) of cyclohexanol.

7. A solid herbicide comprising granular clay, from about 10 to about 25 percent by weight of 2-chloroallyl diethyldithiocarbamate, and from about 10 to about 50 percent by weight (based on the carbamate) of isodecyl alcohol.

8. A solid herbicide comprising granular clay of 10 to 100 mesh particle size distribution, from about 10 to about 25 percent by weight of 2-chloroallyl diethyldithiocarbamate, and from about 10 to about 50 percent by weight (based on the carbamate) of isodecyl alcohol.

9. A solid herbicide comprising granular clay, about 20 percent by weight of 2-chloroallyl diethyldithiocarbamate, and from about 10 to about 50 percent by weight (based on the carbamate) of monobutyl ether of ethylene glycol.

10. A solid herbicide comprising granular clay of 10 to 100 mesh particle size distribution, about 20 percent by weight of 2-chloroallyl diethyldithiocarbamate, and from about 10 to about 50 percent by weight (based on the carbamate) of monobutyl ether of ethylene glycol.

11. A solid herbicide comprising granular clay, about 20 percent by weight of 2-chloroallyl diethyldithiocarbamate, and from about 10 to about 50 percent by weight (based on the carbamate) of cyclohexanol.

12. A solid herbicide comprising granular clay of 10 to 100 mesh particle size distribution, about 20 percent by weight of 2-chloroallyl diethyldithiocarbamate, and from about 10 to about 50 percent by weight (based on the carbamate) of cyclohexanol.

13. A solid herbicide comprising granular clay, about 20 percent by weight of 2-chloroallyl diethyldithiocarbamate, and from about 10 to about 50 percent by weight (based on the carbamate) of isodecyl alcohol.

14. A solid herbicide comprising granular clay of 10 to 100 mesh particle size distribution, about 20 percent by weight of 2-chloroallyl diethyldithiocarbamate, and from about 10 to about 50 percent by weight (based on the carbamate) of isodecyl alcohol.

15. A method of controlling the growth of vegetation which comprises applying from about 1/10 to about 10 pounds per acre of a composition comprising a granular clay containing from about 5 to about 30 percent by weight of a carbamate of the structure

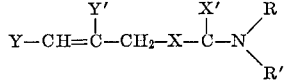

wherein X and X' are atoms selected from the group consisting of oxygen and sulfur, provided at least one of the X and X' atoms is sulfur; wherein Y and Y' are atoms of the group consisting of hydrogen and chlorine, provided at least one of the Y and Y' is chlorine; and wherein R and R' are aliphatic hydrocarbon of up to four carbon atoms, and containing from about 10 to about 50 percent by weight (based on the carbamate) of an alcohol

wherein R" is selected from the group consisting of aliphatic hydrocarbon having from 5 to 12 carbon atoms, the said aliphatic hydrocarbon having at least one oxa atom, and cycloalkyl having 5 to 7 carbon atoms.

16. A method of controlling the growth of vegetation which comprises applying from about 1/10 to about 10 pounds per acre of a composition comprising a granular clay containing from 10 to 25 percent by weight of 2-chloroallyl diethyldithiocarbamate, and from about 10 to about 50 percent by weight (based on the carbamate) of monobutyl ether of ethylene glycol.

17. A method of controlling the growth of vegetation which comprises applying from about 1/10 to about 10 pounds per acre of a composition comprising a granular clay containing from about 10 to about 25 percent by weight of 2-chloroallyl diethyldithiocarbamate, and from about 10 to about 50 percent by weight (based on the carbamate) of cyclohexanol.

18. A method of controlling the growth of vegetation which comprises applying from about 1/10 to about 10 pounds per acre of a composition comprising a granular clay containing from about 10 to about 25 percent by weight of 2-chloroallyl diethyldithiocarbamate, and from about 10 to about 50 percent by weight (based on the carbamate) of isodecyl alcohol.

References Cited by the Examiner

UNITED STATES PATENTS

| | | | |
|---|---|---|---|
| 2,558,762 | 7/1951 | Kohr | 71—2.7 |
| 2,695,840 | 11/1954 | Seppla | 71—2.6 |
| 2,731,337 | 7/1956 | Marrill et al. | 71—2.4 |
| 2,868,688 | 1/1959 | Benesi et al. | |
| 2,875,119 | 2/1959 | Trodeman et al. | |
| 2,919,182 | 12/1959 | Harman et al. | 71—2.7 |
| 3,154,401 | 10/1964 | Boogaart | 71—2.7 |
| 3,179,511 | 4/1965 | Gray et al. | 71—2.7 |

OTHER REFERENCES

Agricultural Chemicals, vol. 11, No. 4, April 1956, pages 4–45, 136, and 137.

LEWIS GOTTS, *Primary Examiner.*